(12) United States Patent
Rozhetsky (10) Patent No.: US 7,071,240 B1
(45) Date of Patent: Jul. 4, 2006

(54) CARBOXYLIC CATIONITES AND METHODS OF MANUFACTURE

(75) Inventor: Karina Rozhetsky, Haifa (IL)

(73) Assignee: Polygran Ltd., Haifa (IL)

( * ) Notice: Subject to any disclaimer, the term of this patent is extended or adjusted under 35 U.S.C. 154(b) by 0 days.

(21) Appl. No.: 09/674,825

(22) PCT Filed: May 7, 1999

(86) PCT No.: PCT/IL99/00241

§ 371 (c)(1),
(2), (4) Date: Dec. 18, 2000

(87) PCT Pub. No.: WO99/58577

PCT Pub. Date: Nov. 18, 1999

Related U.S. Application Data (60) Provisional application No. 60/084,731, filed on May 8, 1998.

(51) Int. Cl.
*C08F 2/00* (2006.01)

(52) U.S. Cl. ............... 521/26; 521/33; 521/38; 526/194; 526/204; 526/261; 526/306; 526/307.1

(58) Field of Classification Search ............... 521/26, 521/33, 38; 526/194, 204, 261, 306, 307.1
See application file for complete search history.

(56) References Cited

U.S. PATENT DOCUMENTS

| | | | | |
|---|---|---|---|---|
| 2,963,453 A | * | 12/1960 | Hwa et al. ............... | 521/31 |
| 3,941,724 A | * | 3/1976 | Bolto ............... | 521/28 |
| 3,988,305 A | * | 10/1976 | Stol et al. ............... | 526/194 |
| 4,120,831 A | | 10/1978 | Kuznetsova et al. | |
| 4,229,545 A | | 10/1980 | Eppinger et al. | |
| 4,245,053 A | | 1/1981 | Nagai et al. | |
| 4,543,363 A | | 9/1985 | Yanagihara | |
| 5,336,742 A | | 8/1994 | Heilmann et al. | |
| 5,510,394 A | | 4/1996 | Hodgdon | |
| 5,834,524 A | | 11/1998 | Bloodworth et al. | |

FOREIGN PATENT DOCUMENTS

SU 499276 * 4/1976

* cited by examiner

*Primary Examiner*—Bernard Lipman
(74) *Attorney, Agent, or Firm*—Mark M. Friedman (57) ABSTRACT

A method for preparing synthetic polymerized resins for ion exchange, namely, carboxylic cationites, which are suitable as sorbents for preparative separation and purification of biologically active compounds by low pressure liquid chromatography (LPLC). The directional polymerization conditions enable such cationites to be prepared with polymeric structures which can be used for the separation of macromolecules, such as proteins, with high molecular mass from various microbiological raw materials and physiological liquids. Depending upon the embodiment of the method of manufacture according to the present invention, the resultant carboxylic cationites are obtained in one of three forms: a swollen block, if no pre-polymerization or dispersion stages are performed; and, if such stages are performed, depending upon the dispersion conditions, the resultant structures can be either irregular particles or spherical granules.

23 Claims, 9 Drawing Sheets

CARBOXYLIC CATIONITES AND METHODS OF MANUFACTURE

This application claims the benefit of Provisional Application No. 60/084,731, filed May 8, 1998.

FIELD AND BACKGROUND OF THE INVENTION

The present invention is of carboxylic cationites with improved sorption capacity, particularly for high molecular weight substances such as proteins, polysaccharides and other macromolecules as well as for improved methods for manufacturing the carboxylic cationites.

Ion exchange is one of the most common procedures for biomolecules isolation and purification, and there are many ion exchanging supports for bio-chromatography. The ion-exchange chromatography technique is based on the ability to separate charged substances by 'adherence' to resins carrying the opposite charge. The ion groups of exchange are bound through a covalent bond to the absorbing matrix.

Many currently available background art sorbent materials for ion-exchange chromatography are based on various polysaccharides such as those known under the trade names Sepharose™, Sephadex™ and so forth. Unfortunately these sorbent materials have only limited sorption ability and are not able to fully separate macromolecules, such as proteins, from complex mixtures in the presence of mineral salts. Therefore, such background art sorbent materials are useful only after the stage of removing mineral salts from the mixture, or "desalting". In addition, the chemical stability and thermostability of these materials is low, and accordingly, they are useful only for a limited number of regeneration cycles.

Carboxylic cationites have a number of advantages over such polysaccharide-based sorbents, and as such are known and widely used for sorption and desorption of various macromolecules such as proteins. One of the advantages of these cationites is that they do not denature the proteins and enzymes during the process of separation. Unfortunately, those carboxylic cationites which are known in the background art largely feature a macroporous structure which has a high flow rate and a low exchange capacity, with limited sorption of macromolecules such as proteins. This structure limits the usefulness of carboxylic cationites for ion exchange chromatography with such macromolecules. The structure of the carboxylic cationites is in turn a result of the method employed for manufacturing these cationites.

U.S. Pat. No. 4,128,032 discloses one such background art method of manufacture for carboxylic cationites. This process involves the co-polymerization of methacrylic or acrylic acids with a suitable crosslinking agent, such as hexahydro-1,3,5-triacryloyltriazine (HTA), N,N'-methylenediacrylamide (MDAA), N,N'-ethylenedimethacrylamide (EDMA), or N,N'-hexamethylenedimethacrylamide (HM-DMA) with an initiator of radical polymerization. The resulting reaction mixture is dispersed in high viscosity liquid, either liquid polyethylsiloxane or polymethylsiloxane, as the dispersing medium.

Unfortunately, the carboxylic cationites prepared according to this background art process do not possess sufficient sorption capacity required for the effective separation of macromolecules such as proteins and enzymes. This deficiency may be caused by the phenomena of absorption and surface tension on the phase interface of the reaction mixture and liquid polysiloxane. This tension may decrease the size of pores formed on the outside surface of the granules of carboxylic cationites. Furthermore, such a process for manufacturing the cationites also has the disadvantage of requiring an organic solvent to wash out the dispersion medium, which is a potential safety hazard and which increases the expense of manufacture.

A further disadvantage of this background art method is the migration of components of the reaction mixture (comonomers and acetic acid) into the dispersion medium, which occurs during the stage of copolymerization. Such migration increases the difficulty of preparing carboxylic cationite granules with reproducible structural properties. Thus, the disclosed background art method has a number of disadvantages.

There is thus a need for, and it would be useful to have, a method for manufacturing carboxylic cationites which requires little or no organic solvent in the dispersion medium, and which results in the production of cationites with reproducible structural properties and efficient sorption of macromolecules such as proteins.

SUMMARY OF THE INVENTION

The present invention is of a method for manufacturing carboxylic cationites which optionally does not include a dispersion stage. If the dispersion stage is performed, preferably the dispersion medium includes an aqueous solution of an inorganic salt. Optionally, if two dispersion stages are performed, one stage is performed with alcohol or a mixture of alcohols.

Various co-polymerization or pre-polymerization solutions are possible. For example, one such solution is a mixture of an aqueous solution and an organic solvent. Preferably, the organic solvent is selected from the group consisting of dimethylformamide, monobutyl glycolate, polyethylene glycol and an alcohol. More preferably, the alcohol is selected from the group consisting of butyl alcohol, octyl alcohol and decyl alcohol. Alternatively, the co-polymerization or pre-polymerization solution is a mixture of an organic solvent and acetic acid. More preferably, the range of concentration of acetic acid is from about 20 percent to about 50 percent volume per volume of the solution for such a mixture. Another preferred solution features an aqueous solution of acetic acid, more preferably in a range of from about 60 percent to about 100 percent, weight per weight.

According to optional but preferred embodiments of the present invention, the dispersion stage is performed in two stages, in which one stage includes dispersion in an aqueous medium containing an inorganic salt, while the other stage includes dispersion in alcohol. The order of these stages preferably depends upon the concentration of the co-monomers, as described in greater detail below.

According to other optional but preferred embodiments of the present invention, no prepolymerization stage is performed, such that the co-monomers undergo co-polymerization directly, without first being incubated during the pre-polymerization stage.

Monovinyl monomers and a cross-linking agent are employed as co-monomers, as described in further detail below. The co-monomers are dissolved in the selected solvent for co-polymerization or pre-polymerization, as described previously. A free radical initiator is then added, also as described in further detail below.

The resultant carboxylic cationites are obtained in one of three forms: a swollen block after co-polymerization in the selected solution, if no dispersion stage is performed; and, if a pre-polymerization stage and a dispersion stage is performed, depending upon the dispersion conditions, the resultant structures can have an irregular or regular form, and can be particles or spherical granules. The typical mean size of the resulting particulate product is in a range of from about 10 to about 200 microns. The structure of the resultant product typically features pores of at least about 0.05 microns (500 Angstrom) in diameter, or even greater sizes. By contrast, carboxylic cationites produced according to the background art method disclosed in U.S. Pat. No. 4,120,831, in which the pre-polymerization solution contains from 5 percent to 50 percent acetic acid in water, and the dispersion medium is a liquid polysiloxane organic solvent, have pores of only 0.02 microns (200 Angstrom) in diameter. The properties of the cationites produced according to the method of the present invention result in improved sorption capacity for macromolecules such as proteins, and is suitable for isolation and purification of a wide range of proteins.

According to the present invention, there is provided a method for producing a carboxyl cationite, comprising the steps of: (a) dissolving a monovinyl monomer and a cross-linking agent as co-monomers in a first solvent to form a first mixture, the first solvent being selected from the group consisting of a mixture of an organic solvent and water, a mixture of an organic solvent and acetic acid, and an aqueous solution of acetic acid wherein an amount of the acetic acid is in a range of from about 60% to about 100%, volume per volume; and (b) adding an initiator of radical polymerization to the first mixture to form a swollen block of the carboxyl cationite, thereby obviating the need for dispersing the carboxyl cationite in a dispersing medium.

According to still another embodiment of the present invention, there is provided a method for forming particulate matter of carboxylic cationites, the method comprising the steps of: (a) dissolving a monovinyl monomer and a cross-linking agent as co-monomers in a first solvent to form a first mixture; (b) adding an initiator of radical polymerization to the first mixture to form a pre-polymer; (c) dispersing the pre-polymer in a solution of alcohol to form a dispersion mixture; and (d) mixing the dispersion mixture with an aqueous solution of an inorganic salt to form the particulate matter.

According to yet another embodiment of the present invention, there is provided a method for forming particulate matter of a carboxylic cationite, the method comprising the steps of: (a) dissolving a monovinyl monomer and a cross-linking agent as co-monomers in a first solvent to form a first mixture; (b) adding an initiator of radical polymerization to the first mixture to form a pre-polymer; and (c) dispersing the pre-polymer in an aqueous solution of an inorganic salt to form the particulate matter.

Hereinafter, the term "macromolecule" refers to at least one such molecule, and optionally a complex of a plurality of such molecules, which could be optionally covalently or non-covalently linked, including but not limited to a protein, polysaccharide, oligopeptide, and an oligonucleotide. Preferably, such a macromolecule has a molecular weight in the range of from about 60,000 Daltons to about 900,000 Daltons.

Hereinafter, the term "aqueous solution" includes water alone as the solution.

Hereinafter, the term "particulate matter" includes, but is not limited to, particles and granules, whether irregular or regular in shape.

BRIEF DESCRIPTION OF THE DRAWINGS:

Reference is now made to the drawings, which illustrate the preferred embodiments the invention may take in physical form and in certain parts and arrangements of parts wherein.

DETAILED DESCRIPTION OF PREFERRED EMBODIMENTS

The present invention is of a method for manufacturing carboxylic cationites with three different structures, according to the embodiment of the method of the present invention which is used.

According to the first embodiment, co-monomers and an initiator are incubated in a solution which is preferably selected from the group consisting of a mixture of water and an organic solvent, a mixture of an organic solvent and acetic acid, and an aqueous solution of acetic acid wherein the amount of the acetic acid is in a range of from about 60 percent to about 100 percent, weight per weight. Most preferably, the solution is the aqueous solution of acetic acid wherein the amount of the acetic acid is in a range of from about 60 percent to about 100 percent, weight per weight. Preferably, the organic solvent is selected from the group consisting of dimethylformamide, monobutyl glycolate, polyethylene glycol and an alcohol. More preferably, the alcohol is selected from the group consisting of butyl alcohol, octyl alcohol and decyl alcohol. Alternatively, the co-polymerization solution is a mixture of an organic solvent and acetic acid. More preferably, the range of concentration of acetic acid is from about 20 percent to about 50 percent volume percent of the total volume of the solution. The co-monomers undergo co-polymerization directly, without the performance of a pre-polymerization stage or a dispersion stage, resulting in the preparation of a swollen block of cationites. For the preparation of the swollen block, the amount of the co-monomers in the selected co-polymerization solution is more preferably is in the range of from about 10 percent to about 30 percent weight per weight.

According to a second embodiment of the method of the present invention, irregular particles are obtained from either a high concentration or a low concentration co-monomer solution. For the third embodiment, spherical granules are obtained from such low concentration or high concentration co-monomer solutions.

For the low concentration co-monomer solution, preferably the concentration of co-monomer is in the range of from about 20 percent to about 30 percent weight per weight. For the high concentration co-monomer solution, preferably the concentration of co-monomer is in the range of from about 50 percent to about 70 percent weight per weight. The preparation of the cationites includes two stages: a pre-polymerization stage, and a dispersion stage.

For the pre-polymerization stage, preferably the co-monomers are incubated with the initiator in a solution which is an aqueous solution of acetic acid. More preferably, the amount of acetic acid is in a range of from about 60 percent to about 100 percent, or alternatively in a range of from about 5 percent to about 15 percent, weight per weight. A mixture of an organic solvent and acetic acid is alternatively and optionally used, as described previously.

The conditions for the dispersion stage(s) preferably differ according to whether a low concentration or a high concentration solution of co-monomers is used for the pre-polymerization stage. If a low concentration solution is used, then preferably the pre-polymer is placed first into a solution of alcohol as the dispersion medium to form a dispersed mixture. More preferably, the ratio of pre-polymer to alcohol is in a range of from about 2.5:1 to about 5:1 to form irregular particles, and is 1:1 to form spherical granules. Next, the dispersed mixture is preferably placed in an aqueous solution of an inorganic salt, more preferably an aqueous solution of sodium sulfate, and most preferably a 20 percent weight per weight aqueous solution of sodium sulfate. The ratio of dispersion mixture to aqueous dispersion solution is preferably in a range of from about 1:4 to about 1:5.

If a high concentration solution is used, then preferably the pre-polymer is placed first into an aqueous solution of an inorganic salt to form the dispersion mixture. The aqueous solution is more preferably an aqueous solution of sodium sulfate, and most preferably a 20 percent weight per weight aqueous solution of sodium sulfate. The ratio of pre-polymer to aqueous dispersion solution is preferably in a range of from about 1:4 to about 1:5. Optionally and more preferably, a solution of alcohol is added to the dispersion mixture. More preferably, the ratio of dispersed mixture to alcohol is in a range of from about 2:1 to about 1:1. If the second dispersion stage in alcohol is not performed, then irregular particles are formed. If both stages are performed, then spherical granules are formed.

For all three embodiments of the method of the present invention, monovinyl monomers and a cross-linking agent are employed as co-monomers. Preferred monovinyl monomers are selected from the group consisting of methacrylic acids, acrylic acids and methacryloylaminocarbonic acids. Examples of such monovinyl monomers include, but are not limited to, methacrylic acid, acrylic acid, methacryloylcaproic acid, methacryloylaminobenzoic acid, methacryloylglycine and methacryloylaminocarbonic acid. The cross-linking agent is preferably a long chain cross-linking agent of at least two repeated carbon groups in the chain, and more preferably of from about 2 to about 10 repeated carbon groups. Most preferably, the cross-linking agent is a polyvinylmonomer selected from the group consisting of hexahydro-1,3,5-triacryloyltriazine (HTA), N,N'-methylenediacrylamide (MDAA), N,N'-ethylenedimethacrylamide (EDMA), N,N'-hexamethylenedimethacrylamide (HMDMA), triallylisocyanurate (TAIC), p-phenylenedimethacrylamide (p-PHDMA), benzidinedimethacrylamide (TDMA) and so forth. Most preferably, the polyvinylmonomer is selected from the group consisting of HTA, EDMA, and TAIC. Also most preferably, the weight ratio of the monovinyl monomer to the polyvinyl-containing cross-linking agent is in the weight ratio of from about 8:1 to about 16:1.

The co-monomers are dissolved in the selected solvent, in which the initiator is also dissolved, for a prepolymerization stage, or else the co-polymerization stage if no prepolymerization stage is performed. The initiator is preferably a free radical initiator selected from the group consisting of ammonium persulfate, a 1,1' azobis (cyclohexanecarbonitrile), and a suitable redox system such as ammonium persulfate-sodium methabisulfite.

The pre-polymerization or co-polymerization stage is preferably performed at a temperature in a range of from about 20 to about 25° C. if the initiator is a redox system, or alternatively at a temperature in a range of from about 50 to about 60° C. if the initiator is ammonium persulfate or a 1,1' azobis (cyclohexanecarbonitrile).

The form and structure of the resultant carboxylic cationites depends upon the conditions of manufacture. If no prepolymerization or dispersion stages are performed, such that the co-monomers are dissolved with the initiator in the selected solution for co-polymerization, then the resultant carboxylic cationites are obtained as a swollen block. The block is then preferably crushed and washed in an aqueous solution. More preferably, the block is washed first with water, then with an aqueous solution of from about 0.5 N to about 1 N sodium hydroxide of pH 8, then with a 1 N aqueous solution of hydrochloric acid, and finally again by water. After these washing steps, the copolymer is fractionated in the wet state. Preferably, the fraction of particles of 100–200 micron diameter is used in the chromatographic column.

Alternatively, if a pre-polymerization stage is performed, then the final form and structure depends upon the dispersion medium. For a low concentration solution of co-monomers in the range of from about 20 percent to about 30 percent weight percent, if the pre-polymer is dispersed first in alcohol at a concentration of 1:1 alcohol to pre-polymer, then spherical granules are obtained. Otherwise, if the ratio of alcohol to pre-polymer is less than 1:1 volume per volume, then irregular particles are obtained. The second stage is performed by placing the dispersion mixture in an aqueous solution of an inorganic salt, as previously described.

For a high concentration solution of co-monomers in the range of from about 50 percent to about 70 percent weight per weight, if a second dispersion stage is performed in alcohol, then spherical granules are obtained. Otherwise, if no second dispersion stage is performed, then irregular particles are obtained. For all of these structures, a similar washing procedure is performed as for the swollen block, except that an initial washing stage with glacial acetic acid is performed before the remaining washing steps.

After washing, the carboxylic cationites are preferably stored in water with 0.03% e-aminocaproic acid as a preservative, more preferably at a temperature of +4° C. in a refrigerator. For the testing of certain parameters and functional performance, the particulate cationite is dried in open air.

The preferred embodiment of the method of the present invention, in which low concentration co-monomer solution is employed, is optionally suitable for immobilization of a co-polymer inside another polymer matrix by simultaneous co-polymerization. According to this optional method, the first pre-polymer reaction mixture is prepared with a low concentration of co-monomers, preferably from a concentration of co-monomers of from about 20 percent to about 30 percent, weight per weight. This reaction mixture is then added to a medium containing the second monomer mixture, in which the medium contains alcohol with a long chain radical, such as butanol. Preferably, the first reaction mixture has a high viscosity, while the second monomer mixture has a lower viscosity. This optional but preferred method results in the formation of matrices of various balances between hydrophilic and hydrophobic properties, containing different functional groups, such as cationic and anionic groups in the co-polymers.

The properties of the cationites produced according to the method of the present invention result in improved sorption capacity for macromolecules such as proteins, and is suitable for isolation and purification of a wide range of proteins.

The ability of a carboxylic cationite to selectively and efficiently absorb macromolecules such as proteins is associated with the chemical nature of the employed co-monomers and the conditions for polymerization, which in turn affect the topology of the polymeric matrix. In order to increase the size of pores of the sorbent without substantially reducing the volume concentration of the functional groups in the polymetric matrix, the copolymerization stage continues in a dispersion medium as previously described.

The components of the co-polymerization solution also have a significant effect on the topology and structure of the resultant polymeric matrix. For example, the intermolecular interaction of the elements of the structure leads to different topologies when an aqueous solution of acetic acid is used, in comparison with a mixture of acetic acid with an organic solvent. The polymer structures of the present invention are more hydrophobic than those disclosed in the background art. This increased hydrophobicity, and the correlation of the balance between hydrophilic and hydrophobic properties and the polymer structure, provide high sorption and improvement of chromatographic selectivity.

The carboxylic cationites prepared according to the method of the present invention are characterized by a number of functional parameters. For example, the swelling factor in H form in water and in a phosphate buffer by pH 7 was determined according to the following procedure. A sample of the swollen fraction of the cationites was placed into a graduated chromatographic column, and cationite volume was measured during the flow of water or phosphate buffer. The specific volume was determined to the weight of the cationites. The weight of sample was defined after drying the cationites, which swelled in water during the flow through the column. The loose weight of the cationite can be described as an index of porosity. The loose weight was measured according to the following procedure. A sample fraction of air-dried loose cationite with a defined fraction particle size of about 100 microns was placed in a cylinder, and the volume and weight of the sample was measured. The loose density was calculated by dividing the weight of the loose sample by the volume. The loose weight of the cationite of the present invention was found to preferably be in a range of from about 0.2 to about 0.6 g/ml or from about 0.06 to about 0.1 g/ml.

Exchange capacity with respect to sodium ions was defined by using 0.1 N sodium hydroxide in presence of 0.1 N sodium chloride solution.

The size of the pores was measured by scanning electron microscopy on prepared samples.

The carboxylic cationites prepared by abovementioned methods have insignificant swelling changes (typically a ratio of 1.2–1.8) due to transformation from the H+form into hydrogen-sodium form upon changing the pH value from 4 to 7, i.e. under the conditions of the sorption-desorption process. This property is in accordance with the requirement of reversible sorption of proteins within the pH range from 4 to 7. The flow rate of a solution, containing proteins, which was passed through the column filled with a carboxylic cationite of the present invention, varied in the range of from about 200 to about 300 ml/hr/cm$^2$, depending on the structure of the cationite, and if the cationite was in the H+ form in the swollen state.

The carboxylic cationites of the present invention were found to be chemically stable in the pH range of from about 1 to about 14, such that they were stable through many cycles of regeneration, typically for about 100 cycles. The cationites were also found to be thermally stable at temperatures as high as 125° C. and as low as −20° C. Carboxylic cationites prepared as particles and spherical granules have an exchange capacity with respect to sodium ions in a range of from about 20 meq/g to about 6 meq/g, and therefore from about 1.3 meq/ml to about 0.6 meq/ml.

The cationites of the present invention have advantages over the conventional ion exchange chromatography materials, CM Sephadex C25™ and CM Sephadex C50™, including higher sorption capacity for proteins, higher chemical stability, thermostability and greater ion exchange capacity. These parameters provide higher chromatographic selectivity for raw physiological liquids. Therefore, the cationites of the present invention are able to separate proteins of various natures and molecular weights from salt-containing solutions in a manner which is selective and fully reversible.

The carboxylic cationites prepared according to the present invention also have reproducible properties and superior sorption performances in comparison to the cationites prepared by the background art method. For example, the hemoglobin sorption capacity obtained with the carboxylic cationites of the present invention ranged from about 70 mg/ml (930 mg/g) to about 230 mg/ml (3830 mg/g) (Hb) while the sorption capacity achieved with the cationites prepared by dispersion in polysiloxane liquids was no more than 40 mg/ml (200–300 mg/g).

A further disadvantage of methods employing polysiloxane liquids is that the resulting cationite must be washed with petroleum, ether, acetones or other organic solvents. These solvents are flammable liquids and therefore appropriate precautions are required for safe performance of the background art process on an industrial scale. It can be readily appreciated that the additional required safety measures adds complications to the entire manufacturing process, thereby rendering the background art process more expensive and less economical. Since the present invention preferably employs an aqueous dispersion medium and/or an alcohol dispersion medium, the resultant cationites do not require washing in flammable solvents, such that the manufacturing method is simple, cheap and easily adaptable to an industrial scale.

This invention will be further illustrated by the following Examples, which by no means limit the scope of the invention.

EXAMPLE 1

A 150 ml flask was provided with a stirrer, an inlet pipe for argon and a dropping funnel. Into this flask, 10 ml of methacrylic acid, 1.22 g of HTA and 45.5 ml of 70% acetic acid were poured. After dissolution of the co-monomers, argon was bubbled for 20 minutes. Then an initiator, 0.0569 g ammonium persulfate, was added. Copolymerization was conducted at a temperature of about 55–60° C. for 50 minutes. Next, the temperature was increased to 100° C., and the mixture was held at that temperature for 1 hour. Next, after cooling to a temperature of 25° C., the resultant swollen block of cationite was crushed, washed with water, a 1 N aqueous solution of sodium hydroxide at pH 8, a 1 N aqueous solution of hydrochloric acid and finally with water. The carboxylic cationite was then fractionated in the wet state.

The yield of cationite in the air-dry state was 10.9 g (96%); the predominant size of particles was 100–200 microns. The exchange capacity with respect to sodium ion was found to be 10.23 meq/g of sorbent. Swelling factor of the cationite in the H-form in water was 4.6. The swelling factor of the cationite in the H-form in a phosphate buffer (pH 7) was 8.2. The specific volume of the cationite in the swollen state was 6.5 ml/g. The sorption capacity with respect to BSA (bovine serum albumin) (molecular mass of 66,000 Daltons) was 80 mg/ml, and was 75.4 mg/ml with respect to beta-globulin. The yield of protein upon desorption was found to be in a range of from about 97% to about 100%. $IgG_1$ was isolated from raw mouse ascites liquid with this carboxylic cationite with a purity of 55.2% and a yield of 66%.

EXAMPLE 2

A 150 ml flask was provided with a stirrer, an inlet pipe for argon and a dropping funnel. Into this flask, 10 ml of methacrylic acid, 133 g of HTA and 45.5 ml of 93% acetic acid were poured. After dissolution of the co-monomers, argon was bubbled for 20 minutes. Then an initiator, 0.0569 g ammonium persulfate, was added. Copolymerization was conducted at a temperature of about 70° C. for 40 minutes. Next, the temperature was increased to 100° C., and the mixture was held at that temperature for 1 hour. Next, after cooling to a temperature of 25° C., the resultant swollen block of cationite was crushed, washed with water, and then with a 1 M aqueous solution of hydrochloric acid. The carboxylic cationite was then fractionated in the wet state.

The yield of cationite in the air-dry state was 10.00 (89%); the predominant size of the particles was in the range of from about 100 to about 200 microns. Exchange capacity with respect to sodium ion was 9.87 meq/g of sorbent.

The swelling factor of the cationite in the H-form in water was 2 and in a phosphate buffer (pH 7) was 5.4. The specific volume of the swollen H-form in water was 9.21 ml/g and in phosphate buffer (pH 7) was 24.8 ml/g.

$IgG_1$ was isolated from raw mouse ascites liquid with this carboxylic cationite in a one-step process with a purity of 88.7% and a yield of 78%.

EXAMPLE 3

A 150 ml flask was provided with a stirrer, an inlet pipe for argon and a dropping funnel. Into this flask, 10 ml of methacrylic acid, 1.22 g of HTA and 45.5 ml of 80% acetic acid were poured. After dissolution of the co-monomers, argon was bubbled for 20 minutes. Then an initiator, 0.0569 g ammonium persulfate, was added. Co-polymerization was conducted at a temperature of from about 55 to about 60° C. for 50 minutes. Next, the temperature was increased to 100° C., and the mixture was held at that temperature for 1 hour. Next, after cooling to a temperature of 25° C., the resultant swollen block of cationite was crushed, washed with water, a 1 N aqueous solution of sodium hydroxide at pH 8, a 1 N aqueous solution of hydrochloric acid and finally with water. The carboxylic cationite was then fractionated in the wet state.

The yield of cationite in the air-dry state was 10.1 g (90%); the predominant size of particles was in a range of from about 100 to about 200 microns. The exchange capacity with respect to sodium ion was 10.00 meq/g of sorbent. The swelling factor of the cationite in the H-form in water was 1.2 and in a phosphate buffer (pH 7) was 2. The specific volume of the swollen H-form in water was 6.1 ml/g and in phosphate buffer (pH 7) was 10.1 ml/g.

$IgG_1$ was isolated from raw mouse ascites liquid with this carboxylic cationite in a one-step process with a purity of 57.6% and a yield of 78%.

EXAMPLE 4

A 150 ml flask was provided with a stirrer, an inlet pipe for argon and a dropping funnel. Into this flask, 10 ml of methacrylic acid, 1.22 g of HTA and 45.5 ml of a solution of water and 1 ml of polyethyleneglycol were poured. After dissolution of the co-monomers, argon was bubbled for 20 minutes. Then an initiator, 0.056 g ammonium persulfate, was added. Copolymerization was conducted at a temperature of from about 50 to about 60° C. for 50 minutes. Next, the temperature was increased to 100° C., and the mixture was held at that temperature for 1 hour. Next, after cooling to a temperature of 25° C., the resultant swollen block of cationite was crushed, washed with water, a 1 N aqueous solution of sodium hydroxide at pH 8, a 1 N aqueous solution of hydrochloric acid and finally with water. The carboxylic cationite was then fractionated in the wet state.

The yield of cationite in the air-dry state was 10.9 g (96%); the predominant size of particles was in a range of from about 100 to about 200 microns. The exchange capacity with respect to sodium ion was 10.01 meq/g of sorbent. The swelling factor of the cationite in the H-form in water was 2.8 and in a phosphate buffer (pH 7) was 4. The specific volume of the swollen H-form in water was 4.3 ml/g and in phosphate buffer (pH 7) was 6.2 ml/g.

$IgG_1$ was isolated from desalted mouse ascites liquid with this carboxylic cationite in a one-step process with a purity of 40% and a yield of 98.3%. The sorption capacity of IgG1 contaminating proteins for isolation from raw ascites fluid was about 40%, such that this cationite may be used for a preliminary step of purification of $IgG_1$.

EXAMPLE 5

A 250 ml flask was provided with a stirrer, an inlet pipe for argon and a dropping funnel. Into this flask, 180 ml of 20% sodium sulfate was poured and argon was bubbled for 30 minutes. At the same time, 10 ml of methacrylic acid, 1.22 g of HTA and 45.5 ml of 70% acetic acid was charged into the funnel in a current of argon. After dissolution of the co-monomers, an initiator, 0.0569 g ammonium persulfate, was added. Copolymerization was conducted at a temperature of about 60° C. for 8 minutes to obtain a high viscosity pre-polymer. The pre-polymer was dispersed with 20 ml of butanol as the dispersion medium. After stirring, the resultant dispersion was poured into 180 ml of a solution of 20% sodium persulfate. The temperature was maintained at 60° C. for 30 minutes. Next, the temperature was increased to 100° C., and the mixture was held at that temperature for 1 hour.

Next, after cooling to a temperature of 25° C., the resultant particles of cationite were separated from the dispersion phase. The particles were then washed with glacial acetic acid, then with water, next with a 1 N aqueous solution of sodium hydroxide at pH 8, then with a 1 N aqueous solution of hydrochloric acid and finally with water. The carboxylic cationite was then fractionated in the wet state.

The predominant particle size was 100 microns in the globular form, and otherwise 200×100 microns. The exchange capacity with respect to sodium ion was 1.3 meq/ml, 21.3 meq/g of sorbent. The specific volume of the swollen H-form in water was 16 ml/g and in phosphate buffer (pH 7) was 22.4 ml/g.

The sorption capacity of this cationite with respect to Hb (hemoglobin, molecular weight of 66,000 Daltons) was 230 mg/ml, 3830 mg/g of sorbent.

EXAMPLE 6

A 250 ml flask was provided with a stirrer, an inlet pipe for argon and a dropping funnel. Into this flask, 140 ml of 20% sodium sulfate was poured and argon was bubbled for 30 minutes. At the same time, 5 ml of methacrylic acid, 0.61 g of HTA and 5 ml of 5% acetic acid was charged into the funnel in a current of argon. After dissolution of the co-monomers, a mixture of 0.044 g ammonium persulfate and 0.015 sodium methabisulfite was added as the initiator. Copolymerization was conducted at a temperature of about 22° C. for 8 minutes to obtain a pre-polymer. The pre-polymer was dispersed with 50 ml of an aqueous solution of 20% sodium sulfate as the dispersion medium. While stirring, the temperature was maintained at 22° C. for 20 minutes. The temperature was increased to 50° C. for 10 minutes, and then to 60° C. for 20 minutes. Next, the temperature was increased to 100° C., and the mixture was held at that temperature for 1 hour.

Next, after cooling to a temperature of 25° C., irregular particles of cationite were separated from the dispersion phase by a water-jet pump. The particles were then washed with glacial acetic acid, then with water, next with a 1 N aqueous solution of sodium hydroxide at pH 8, then with a 1 N aqueous solution of hydrochloric acid and finally with water. The carboxylic cationite was then fractionated in the wet state.

The predominant particle size was 200×100 microns. The exchange capacity with respect to sodium ion was 1.2 meq/ml or 12.8 meq/g. The specific volume of the swollen H-form in water was 10.5 ml/g and in phosphate buffer (pH 7) was 13.5 ml/g.

EXAMPLE 7

A 250 ml flask was provided with a stirrer, an inlet pipe for argon and a dropping funnel. Into this flask, 140 ml of an aqueous solution of 20% sodium sulfate was poured and argon was bubbled for 30 minutes. At the same time, 5 ml of methacrylic acid, 0.61 g of HTA and 5 ml of 70% acetic acid was charged into the funnel in a current of argon. After dissolution of the co-monomers, 0.0569 g ammonium persulfate was added as the initiator. Co-polymerization was conducted at a temperature of about 55° C. for 15 minutes to obtain a pre-polymer. The pre-polymer was dispersed with 50 ml of an aqueous solution of 20% sodium sulfate as the dispersion medium. The mixture was stirred for 5 minutes without heating. The temperature was then increased to 70° C. for 45 minutes, and then to 90° C. for 30 minutes. 17 ml of butanol was then added, and the temperature was maintained for 30 minutes. Next, the temperature was increased to 100° C., and the mixture was held at that temperature for 30 minutes.

Next, after cooling to a temperature of 25° C., granules of cationite were separated from the dispersion phase by a water-jet pump. The particles were then washed with glacial acetic acid, then with water, next with a 1 N aqueous solution of sodium hydroxide at pH 8, then with a 1 N aqueous solution of hydrochloric acid and finally with water. The carboxylic cationite was then fractionated in the wet state.

The predominant particle size was in a range of from about 20 to about 70 microns. The exchange capacity with respect to sodium ion was 0.83 meq/ml or 11.2 meq/g. The specific volume of the swollen H-form in water was 12.5 ml/g and in phosphate buffer (pH 7) was 23 ml/g.

EXAMPLE 8

A 250 ml flask was provided with a stirrer, an inlet pipe for argon and a dropping funnel. Into this flask, 140 ml of 20% sodium sulfate was poured and argon was bubbled for 30 minutes. At the same time, 5 ml of methacrylic acid, 0.61 g of HTA and 22.8 ml of 5% acetic acid were charged into the funnel in a current of argon. After dissolution of the co-monomers, a mixture of 0.044 g ammonium persulfate and 0.015 sodium methabisulfite was added as the initiator. Copolymerization was conducted at a temperature of about 22° C. for 15 minutes to obtain a pre-polymer.

The prepolymer was dispersed with 23 ml of an organic phase, which included 20.2 ml (16.34 g) of butanol and 2.8 ml (2.3 g) of layrilic alcohol. After stirring, the dispersion was poured into 140 ml of a 20% sodium sulfate aqueous solution.

Stirring was continued for 5 minutes, then the process was allowed to incubate at 22° C. for 5 hours. The flask temperature was then increased to 48–55° C. and was held at 55° C. for an hour. Stirring was then stopped overnight. The heating process with stirring was resumed the next day, starting at a temperature of 50° C., with an increase in temperature of 10° C. every 0.5 hour to a final temperature of 100° C., which was maintained for 30 minutes.

Next, after cooling to a temperature of 25° C., granules of cationite were separated from the dispersion phase. The granules were then washed with glacial acetic acid, then with water, next with a 1 N aqueous solution of sodium hydroxide at pH 8, then with a 1 N aqueous solution of hydrochloric acid and finally with water.

The total binding capacity of hemoglobin was 74 mg/ml or 908 mg/g. The specific volume of the swollen H-form in water was 12.3 ml/g and in phosphate buffer (pH 7) was 18.4 ml/g.

EXAMPLE 9

A 250 ml flask was provided with a stirrer, an inlet pipe for argon and a dropping funnel. Into this flask, 140 ml of 20% sodium sulfate was poured and argon was bubbled for 30 minutes. At the same time, 5 ml of methacrylic acid, 0.61 g of HTA and 22.8 ml of 70% acetic acid were charged into the funnel in a current of argon. After dissolution of the co-monomers, 0.0569 g ammonium persulfate was added as the initiator. Copolymerization was conducted at a temperature of about 60° C. for 50–60 minutes to obtain a prepolymer.

The prepolymer was dispersed with 23 ml of an organic phase, which included 20.2 ml (16.34 g) of butanol, 2.8 ml (2.3 g) of layrilic alcohol and 0.23 g oleic acid. After stirring, the dispersion was poured into 140 ml of a 20% sodium sulfate aqueous solution.

Stirring was continued for 5 minutes, and then the flask temperature was increased to 60° C. for 30 minutes. The flask temperature was then increase to 70° C. over 30 minutes, with an increase in temperature of 10° C. every 40 minutes to a final temperature of 100° C., which was maintained for 30 minutes.

Next, after cooling to a temperature of 25° C., granules of cationite were separated from the dispersion phase. The granules were then washed with glacial acetic acid, then with water, next with a 1 N aqueous solution of sodium hydroxide at pH 8, then with a 1 N aqueous solution of hydrochloric acid and finally with water. The carboxylic cationite was then fractionated in the wet state.

The predominant particle size was in a range of from about 40 to about 120 microns. The exchange capacity with respect to sodium ion was 0.56 mg/ml. The specific volume of the swollen H-form in water was 30 ml/g and in phosphate buffer (pH 7) was 60 ml/g. The total binding capacity of hemoglobin was 94.7 mg/ml or 2841 mg/g.

EXAMPLE 10

The chemical and physical properties of two of these carboxylic cationites of the present invention, #27 and #44, were examined in further detail. Cationites #27 and #44 were prepared as swollen blocks. Cationite #27 was prepared as for Example 1, while cationite #44 was prepared as for Example 4.

First, water regain was examined for sorbents in the H+form in sodium phosphate buffer as a function of the pH. Water regain was found to reach a steady state at pH 6 for #44 and at pH 7 for #27. The results are summarized in Table 1.

TABLE 1

| Water regain as a function of pH | | |
|---|---|---|
| Buffer & pH | #27 | #44 |
| phosphate buffer, pH 3 | 100 | 100 |
| phosphate buffer pH 6 | 150 | 125 |
| phosphate buffer pH 7 | 185 | 125 |
| phosphate buffer pH 8 | 185 | 125 |

The mechanical stability and elasticity of these cationites was then tested as follows. Bed volume was measured in correlation with flow rate, which was sustained by a peristaltic (0.28 cm$^2$×10 cm column). The reduction in volume was about 15% to about 20% of the initial volume, up to a flow rate of about 350 ml/h$^{-1}$/cm$^{-2}$.

The chemical stability of cationites #27 and #44 against oxidative agents was then tested by incubating these cationites with 0.3 g/l NaOCl (RT) for about 16 hours. The water regain and H+ ion binding capacity were then examined. Both were found to have remained substantially unchanged (maximum difference of 6% and 5% respectively).

These cationites were also tested for their ability to undergo regeneration cycles, for example with 0.5–1.0 M NaOH and 0.1 M HCl, ethanol or various organic solvents. The average regeneration cycle number while maintaining sorbing capacity was found to be about 100.

EXAMPLE 11

The chromatographic resolving properties of two of the carboxylic cationites of the present invention, #27 and #44, were examined in further detail, in comparison to CM Sepharose™ (Pharmacia Ltd., hereinafter referred to as "commercial product #1") and Bio-Rex 70™ (Bio-Rad Ltd., 100–200 mesh, hereinafter referred to as "commercial product #2"). The experimental method was as follows.

Three fold diluted rabbit serum proteins were loaded on columns packed with #27, #44, commercial product #1 or commercial product #2.

Figure 1A:
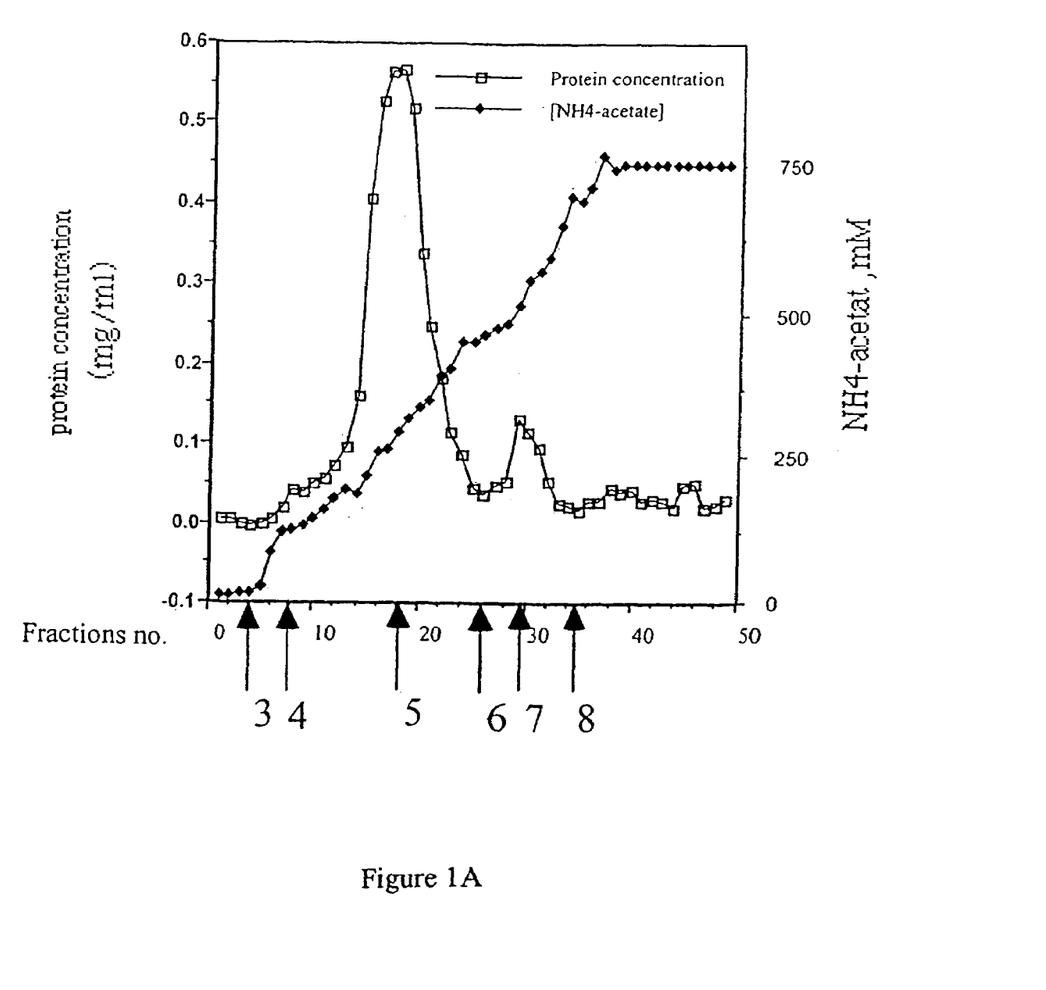
FIGS. 1A and 1B illustrate fractions containing albumin fraction when desorption was performed in a salt gradient of 0–0.75 M ammonium acetate in 20 mM Tris, pH 7.2.
Figure 1B:
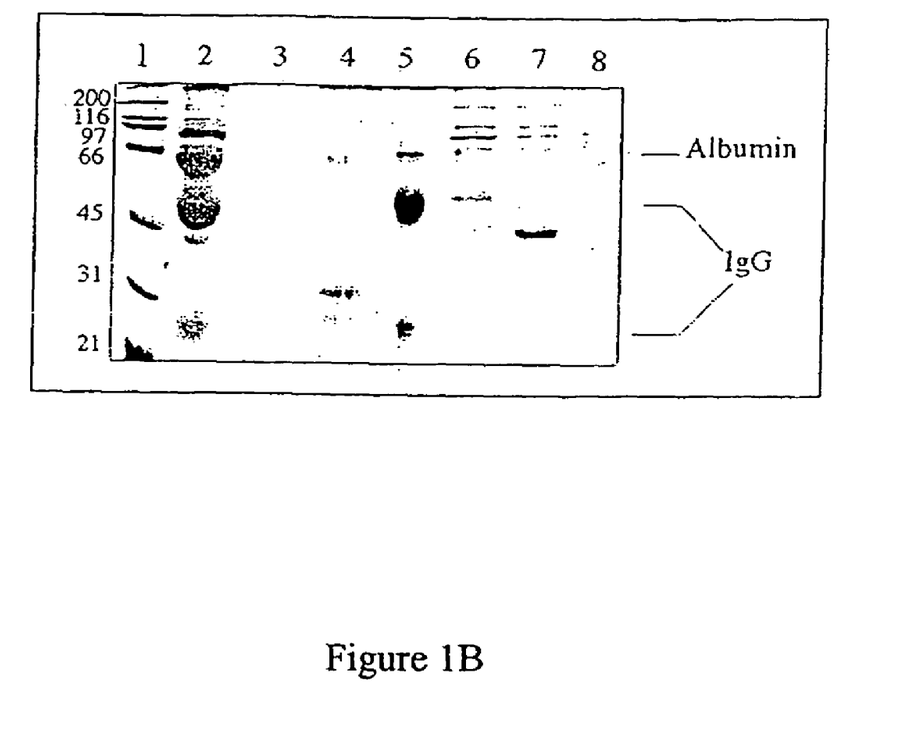

For #27 or #44, cationites of the present invention, adsorption was performed in a buffer containing 10 mM sodium acetate, pH 5. Desorption was performed in a salt gradient of 0–0.75 M ammonium acetate in 20 mM Tris, pH 7.2. Fractions numbered 3–8 were collected as shown by the arrows in FIG. 1A, and then loaded on an SDS-PAGE gel, shown in FIG. 1B. The lanes of the SDS-PAGE gel were loaded as follows: lane 1-molecular weight markers; lane 2—serum polypeptides before separation; lanes 3–8 correspond to the collected fractions. FIGS. 1A and 1B are shown for cationite #27, but a similar separation profile was obtained for cationite #44.

As can be seen in FIGS. 1A and 1B, fractions 8–10 contain the albumin fraction, while fractions 10–24 contain IgG$_1$. None of the protein eluted before the salt gradient.

Figure 2A:
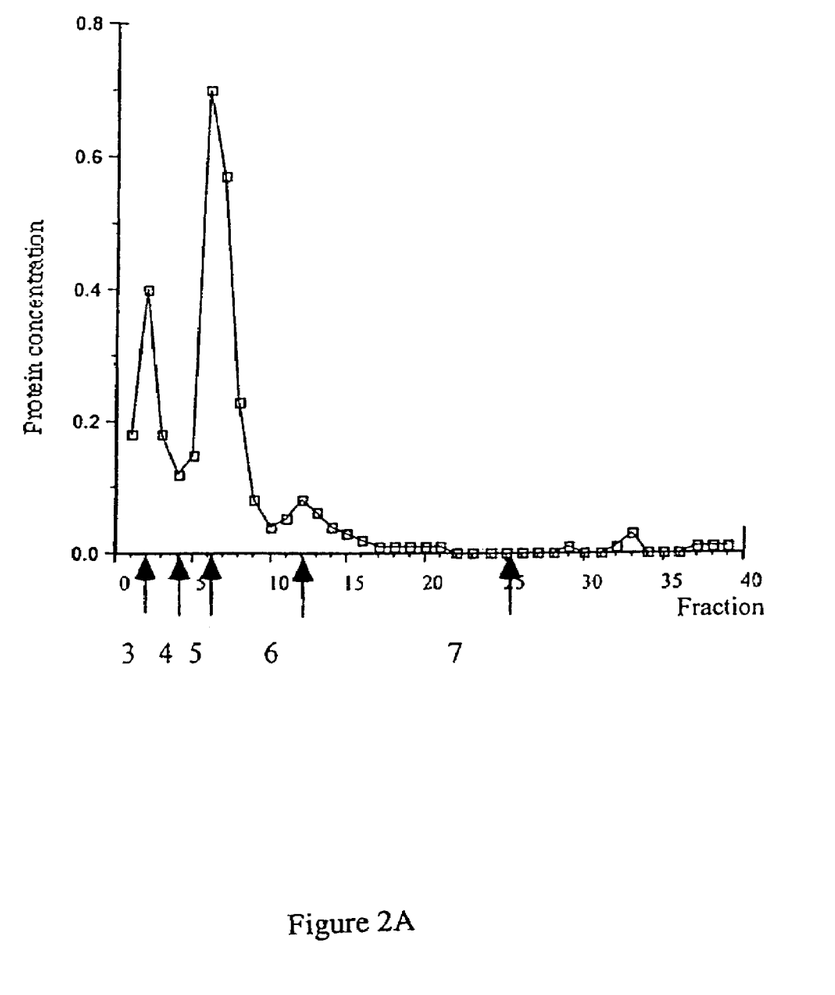
FIGS. 2A and 2B illustrate fractions from desorption in a continuous salt gradient of 0–0.5 M NaCl in 20 mM phosphate buffer pH 7.2, and loaded on an SDS-PAGE gel.
Figure 2B:
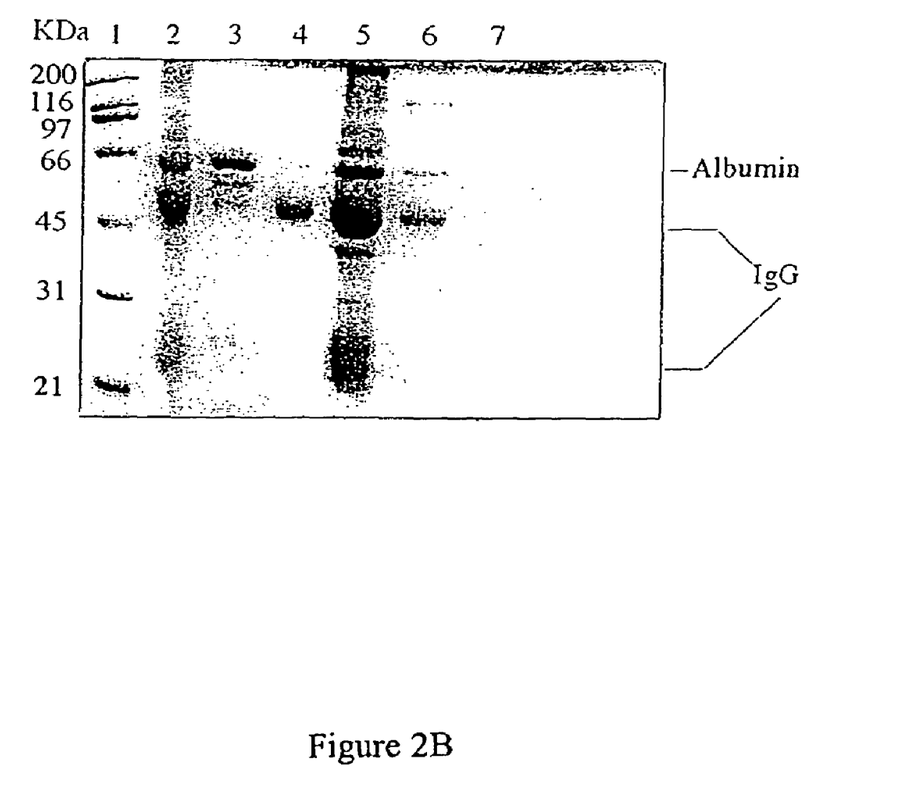

For commercial product #1, adsorption was performed in 10 mM sodium acetate, pH 4.8 or 20 mM phosphate buffer, pH 7.2. Desorption was performed in a continuous salt gradient of 0–0.5 M NaCl in 20 mM phosphate buffer pH 7.2. Fractions were collected as shown by the arrows in FIG. 2A, and were then loaded on an SDS-PAGE gel as shown in FIG. 2B. Lanes are as for FIG. 1B. Essentially, most of the protein eluted before the salt gradient and did not bind to the resin. Some separation of serum proteins occurred at pH 4.8, but none occurred at pH 7.2.

Figure 3A:
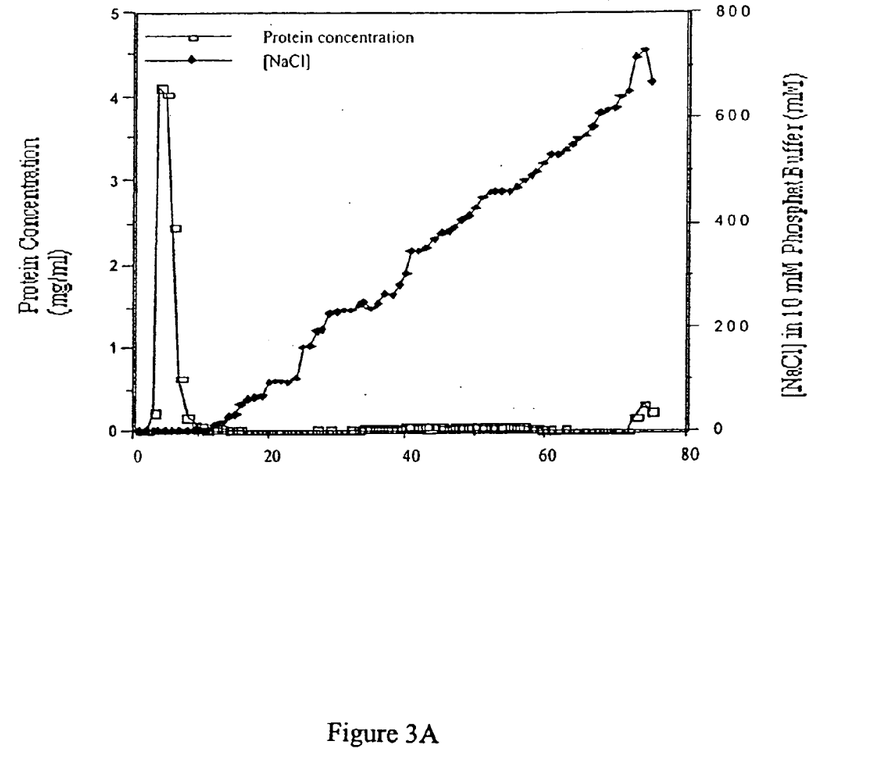
FIGS. 3A and 3B illustrate fractions from desorption in a continuous salt gradient of 0–0.75 M NaCl in 10 mM phosphate buffer pH 6.5, and loaded on an SDS-PAGE gel.
Figure 3B:
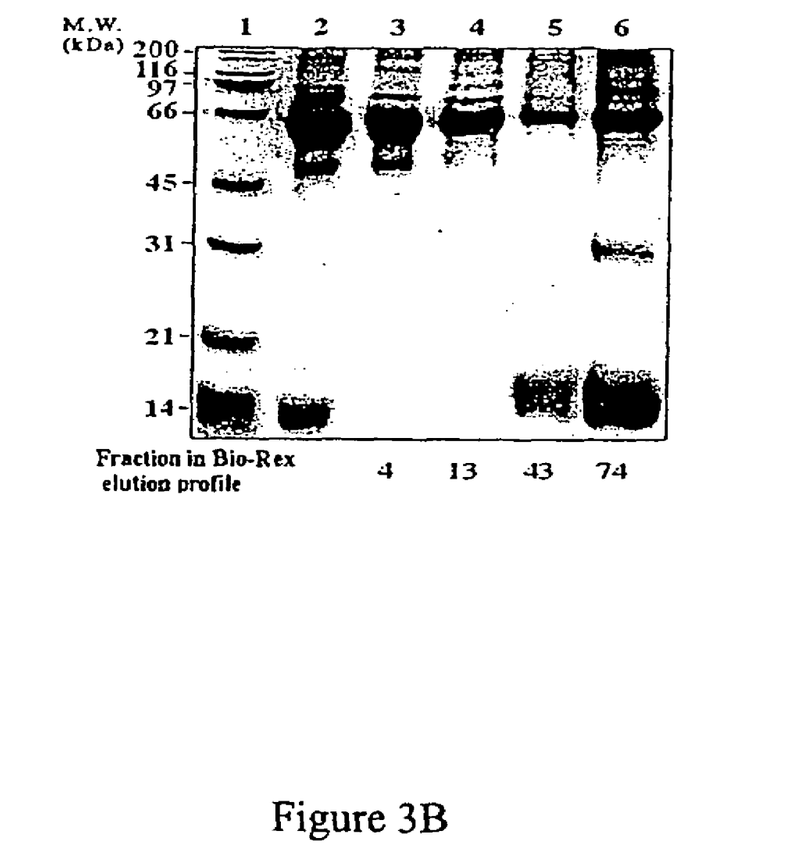

For commercial product #2, adsorption was performed in 10 mM phosphate buffer, pH 6.5. Desorption was performed in a continuous salt gradient of 0–0.75 M NaCl in 10 mM phosphate buffer pH 6.5. Fractions were collected as shown in FIG. 3A, and were then loaded on an SDS-PAGE gel as shown in FIG. 3B. Lanes are as for FIG. 1B, except that the fraction number is indicated below each lane. Essentially, most of the protein eluted before the salt gradient and did not bind to the resin. Furthermore, the majority of both albumin and IgG$_1$ eluted in a single peak, which is the first peak as shown.

EXAMPLE 12

Protein purity and recovery was tested by using several carboxylic cationite sorbents of the present invention, commercial product #1, DEAE cellulose DE-52 (hereinafter referred to as "commercial product #3") and CM Sephadex C-25 and C-50™ (Pharmacia Ltd., hereinafter referred to as "commercial product #4" and "commercial product #5", respectively).

The first test was performed to recover Immunoglobulin G$_1$ (Ig G$_1$) from initial ascites mouse fluid diluted with 2 M ammonium sulfate, pH 6.32, 1:1 volume per volume. The column was 0.78×4.2 cm, packed with 2 ml of the sorbent. The flow rate was 37 ml/h/cm$^2$. The sorbent was regenerated by using 1 M NaOH, followed by 1 M HCl, followed by water, followed by equilibration with 0.1 M acetate buffer, pH 5. Desorption was performed with a stepwise pH gradient of 0.1 M citrate buffer, pH 5 to 7.7, to pH 7.7 buffer with 0.2 M NaCl.

No purification was observed with commercial product #2. Carboxylic cationites #22 and #28 of the present invention were tested. Results are shown in Table 2. Cationite #22 was prepared as for Example 2, while cationite #28 was prepared as for Example 3.

TABLE 2

| Sorbent | immuno-globulin in peaks (µg) | recovery (peak %) | purity, % | desorption (total µg) | total recovery, % |
|---|---|---|---|---|---|
| #22 | 89 | 5.6 | 2.6 | 484 | 30.7 |
|  | 395 | 25 | 9.3 |  |  |
| #22 | 57 | 3.6 | 9.7 | 446 | 28.2 |
|  | 29 | 1.8 | 0.5 |  |  |
|  | 354 | 22.4 | 88.7 |  |  |
| #28 | 25 | 1.6 | 1.5 | 730 | 46.2 |
|  | 136 | 8.6 | 4.9 |  |  |
|  | 567 | 35.9 | 57.6 |  |  |

The next test was performed to recover Immunoglobulin $G_1$ (Ig $G_1$) from desalted ascites mouse fluid diluted with 0.1 M acetic acid, pH 5, 1:1 volume per volume. The column was 0.78×3.8 cm, packed with 2 ml of the sorbent. The flow rate was 37 ml/h/cm². The sorbent was regenerated by using 1 M NaOH, followed by 1 M HCl, followed by water, followed by equilibration with 0.1 M acetate buffer, pH 5. Desorption was performed with a stepwise pH gradient of 0.1 M citrate buffer, pH 5 to 6.

Commercial product #3 and carboxylic cationites #26, #27, #36, #37, and #44 of the present invention were tested. Results are shown in Table 3.

TABLE 3

| Sorbent | immuno-globulin in peaks (µg) | recovery (peak %) | purity, % | desorption (total µg) | total recovery, % |
|---|---|---|---|---|---|
| #26 | 1,220 | 54.1 | 69.2 | 1,705 | 62.0 |
|  | 0.267 |  | 100 |  |  |
| #27 | 2,290 | 83.3 | 66.0 | 2,368 | 86.1 |
| #36 | 2,317 | 95.9 | 62.3 | 2,782 | 101.2 |
|  | 0.319 |  | 62.2 |  |  |
| #37 | 1,337 | 72.5 | 100 | 2,092 | 76.1 |
|  | 0.656 |  | 16.8 |  |  |
| #44 | 2,419 | 88.0 | 39.5 | 2,701 | 98.3 |
| commercial product #3 | 2,613 | 95.1 | 30.1 | 2,749 | 100 |

Table 4 shows a comparison between the efficacy of carboxylic cationites #25, #26; #27, #28, #30, #36 and 37 of the present invention for either desalted or initial mouse ascites fluid. Cationite #25 was prepared with 20 percent weight per weight co-monomers, which were methacrylic acid and HTA as the cross-linking agent, with 1,1' azobis (cyclohexanecarbonitrile) as the initiator, in a solution of glacial acetic acid (100%) to form a swollen block. Cationite #27 was prepared with 5 percent acetic acid in octyl alcohol. Cationite #27 was prepared with 70 percent volume per volume acetic acid in water solution. Cationite #30 was prepared as for cationite #25, except that the co-polymerization solution was 93% acetic acid and 7% dimethylformamide, volume per volume. Cationite #36 was prepared from 20 percent dimethylformamide volume per volume in acetic acid. Cationite #37 was prepared with 5 percent volume per volume acetic acid in butyl alcohol.

Max purity refers to the purity % in the purest peak. Max recovery refers to the percentage recovery in purest peak alone, and Desor. (µg) refers to the total protein desorption in micrograms.

TABLE 4

| | desalted ascites | | | initial ascites | | |
|---|---|---|---|---|---|---|
| sorbent | max purity | max recovery | desor. (µg) | max purity | max recovery | desor. (µg) |
| #25 | 4.7 | 15.3 | 241 | 11.7 | 3.8 | 208 |
| #27 | 33.5 | 58.3 | 1,247 | 6.5 | 10.3 | 339 |
| #28 | 100 | 16 | 499 | 57.6 | 35.9 | 730 |
| #30 | 17.4 | 40.2 | 636 | 7.4 | 22.4 | 354 |

The next test was performed in a two-step purification to recover Immunoglobulin $G_1$ (Ig $G_1$) from desalted ascites mouse fluid diluted with water, pH 7.25, 1:1 volume per volume. The column was 0.78×3.8 cm, packed with 1 ml of the sorbent. The flow rate was 37 ml/h/cm². The sorbent was regenerated by using 1 M NaOH, followed by 1 M HCl, followed by water, followed by equilibration with 0.1 M acetate buffer, pH 5. Desorption was performed with a stepwise pH gradient of 0.1 M citrate buffer, pH 5 to 8.2. In the second step, unsorbed eluted fractions 1–12 from a column of cationite #44 were loaded onto a column with cationite #27. The comparison was to commercial product #1. Results are shown in Table 5.

TABLE 5

| Sorbent | immuno-globulin in peaks (µg) | recovery (peak %) | purity, % | desorption (total µg) | total recovery, % |
|---|---|---|---|---|---|
| First step-#44 | 19.1 | 0.3 | 0.7 | 19.1 | 0.7 |
| Second step-#27 | 5,275 | 86.3 | 75.4 | 5,310 | 86.6 |
| commercial product #1 | 4,253 | 69.5 | 65.1 | 4,300 | 70.3 |

The next test was performed in a two-step purification to recover Immunoglobulin $G_1$ (Ig $G_1$) from dialyzed ascites mouse fluid diluted with water, pH 7.25, 1:1 volume per volume. The column was 0.78×3.8 cm, packed with 1 ml of the sorbent. The flow rate was 37 ml/h/cm². The sorbent was regenerated by using 1 M NaOH, followed by 1 M HCl, followed by water, followed by equilibration with 0.1 M acetate buffer, pH 5. Desorption was performed with a stepwise pH gradient of 0.1 M citrate buffer, pH 5 to 8.2. In the second step, unsorbed eluted fractions 1–5 from a column of cationite #44 were loaded onto a column of cationite #27. The comparison was to commercial product #1. Results are shown in Table 6.

TABLE 6

| Sorbent | immuno-globulin in peaks (µg) | recovery (peak %) | purity, % | desorption (total µg) | total recovery, % |
|---|---|---|---|---|---|
| First step-#44 | 5,829 | 63.0 | 100 | 8,617 | 93.2 |
|  | 2,789 | 30.2 | 42.5 |  |  |
| Second step-#27 | 267 | 2.9 | 44.1 | 267 | 2.9 |
| commercial product #1 | 4,362 | 47.2 | 59.9 | 6,780 | 73.3 |
|  | 2,418 | 26.1 | 35.5 |  |  |

The next test was performed to recover Immunoglobulin $G_{2A}$ (Ig $G_{2A}$) from initial ascites mouse fluid diluted with water, pH 8.256, 2:1 volume per volume, electroconductivity 5.5 except for commercial product #1–2 (CM Sepharose Fast Flow –2), where the dilution ratio was 6:1 volume per volume, electroconductivity 2.8. The column was 0.78×3.8 cm, packed with 1 ml of the sorbent. The flow rate was 37 ml/h/cm². The cationite was regenerated by using 1 M NaOH, followed by 1 M HCl, followed by water, followed by equilibration with 0.1 M acetate buffer, pH 5. Desorption was performed with a stepwise pH gradient of 0.1 M citrate buffer, pH 5 to 8.2.

Commercial product #1 and cationites #27 and #44 were tested. Results are shown in Table 7.

TABLE 7

| Sorbent | immuno-globulin in peaks (μg) | purity, % | desorption (total μg) | total recovery, % |
| --- | --- | --- | --- | --- |
| #27 | 1,272 | 10.1 | 1,377 | 49.2 |
|  | 51 | 1.8 |  |  |
|  | 53 | 1.9 |  |  |
| #44 | 1,425 | 10.5 | 1,514 | 54.1 |
|  | 90 | 2.1 |  |  |
| commercial product #1-1 | 484 | 5.5 | 537 | 19.2 |
|  | 53 | 27.9 |  |  |
| commercial product # 1-2 | 1,006 | 5.5 | 1,006 | 35.9 |

The next test was performed to separate a mixture of human and goat serum albumin diluted with acetic buffer, pH 5.8, 1:1 weight per weight. The column was 0.02×0.9 cm, packed with 1 ml of the cationite sorbent. The flow rate was 37 ml/h/cm². The sorbent was regenerated by using 1 M NaOH, followed by 1 M HCl, followed by water, followed by equilibration with 0.1 M acetate buffer, pH 5. Desorption was performed with a stepwise pH gradient of 0.5 M ammonium acetate buffer, pH 4.5 to 7. Carboxylic cationite #27 was tested. Results are shown in Table 8.

TABLE 8

| Sorbent | Protein solution: sorbent (v:v) | protein pH | purity of main peak | recovery, % | minimum # of peaks |
| --- | --- | --- | --- | --- | --- |
| #27 (1) | 4.6:1 | 4.7 | 78 | 96 | 5 |
| #27 (2) | 18:1 | 5.8 | 89 | 20 | 1 |

Figure 4:
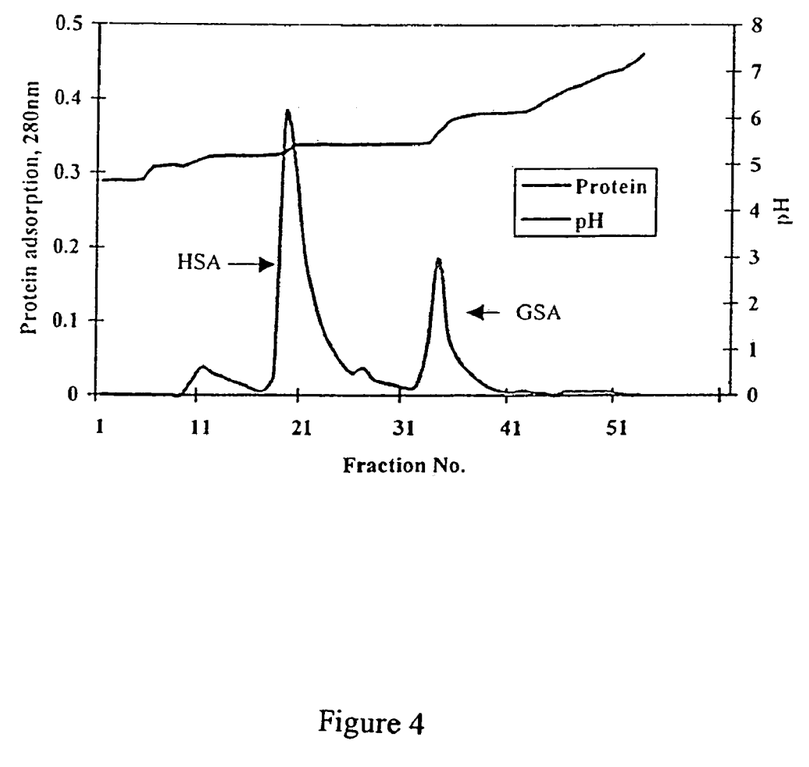
FIG. 4 is a graph showing a separation of a mixture of human (HSA) and goat (GSA) serum albumin diluted with acetic buffer, pH 4.7, 1:1 weight per weight, using cationite #27.

Next, a graph was prepared for such a separation of a mixture of human (H SA) and goat (GSA) serum albumin diluted with acetic buffer, pH 4.7, 1:1 weight per weight, using cationite #27, shown in FIG. 4. The column was 0.02 cm²×3 cm, packed with 5 ml of the cationite sorbent. The flow rate was 37 ml/h/cm². The sorbent was regenerated by using 1 M NaOH, followed by 1 M HCl, followed by water, followed by equilibration with 0.1 M acetate buffer, pH 4.7. Desorption was performed with a stepwise pH gradient of 0.5 M ammonium acetate buffer, pH 5 to 7.5. Cationite #27 was tested.

Figure 5:
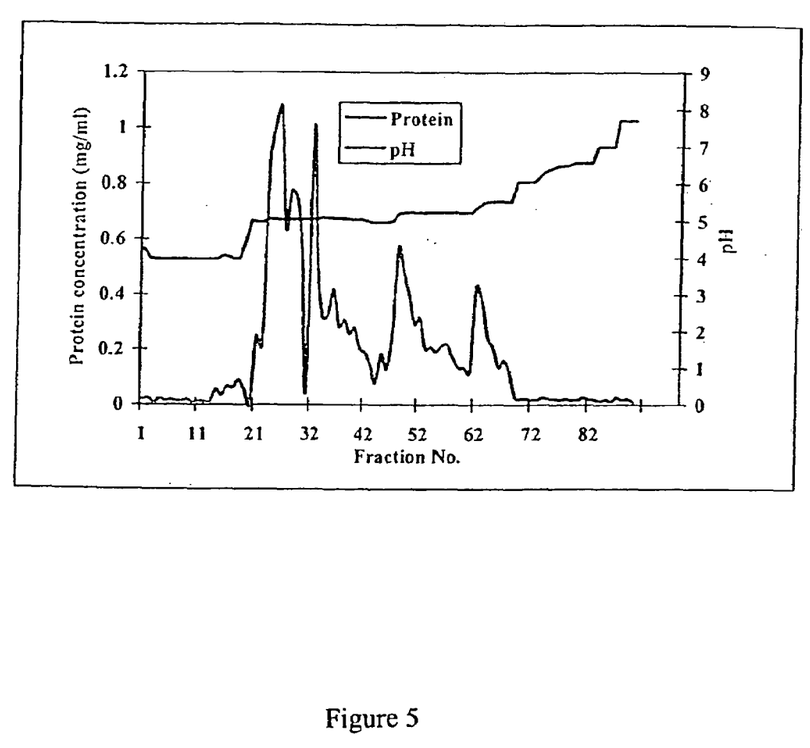
FIG. 5 shows a graph of a separation of non-treated fresh milk proteins, in which the calcium concentration was 1.25 mg/ml.

FIG. 5 shows a graph of a separation of non-treated fresh milk proteins, in which the the cationite sorbent. The flow rate was 37 ml/h/cm². The sorbent was regenerated by using 1 M NaOH, followed by 1 M HCl, followed by water, followed by equilibration with 0.1 M acetate buffer, pH 4.7. Desorption was performed with a stepwise pH gradient of 0.5 M ammonium acetate buffer, pH 5 to 7.7. Cationite #27 was tested.

Figure 6:
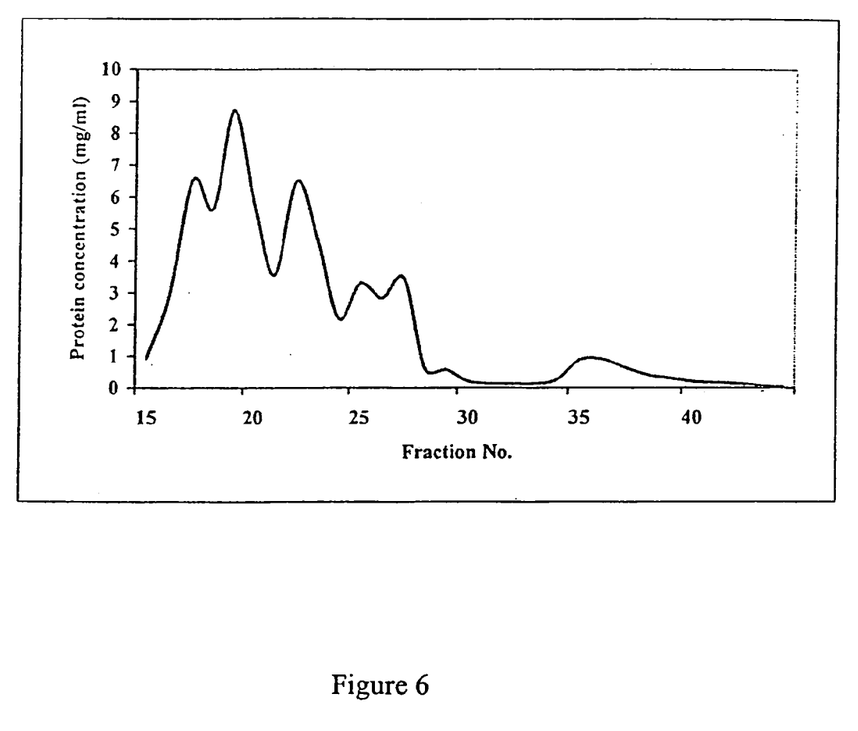
FIG. 6 shows a graph of a separation of human blood plasma proteins, diluted with water 2:1 (weight per weight).

FIG. 6 shows a graph of a separation of human blood plasma proteins, diluted with water 2:1 (weight per weight). The columm was 2 cm²×0.6 cm, packed with 1 ml of the cationite sorbent. The flow rate was 37 ml/h/cm². The sorbent was regenerated by using 1 M NaOH, followed by 1 M HCl, followed by water, followed by equilibration with 0.1 M acetate buffer, pH 4.7. Desorption was performed with stepwise pH gradients of pH (7.7–10.8), ammonium acetate concentration (0.25 to 0.3 M), combined with ammonium chloride and ammonium hydroxide. Carboxylic cationite #27 of the present invention was tested.

It will be appreciated that the above descriptions are intended only to serve as examples, and that many other embodiments are possible within the spirit and the scope of the present invention.

What is claimed is:

1. A method for forming particulate matter of carboxylic cationites, the method comprising the steps of:
    (a) dissolving a monovinyl monomer and a cross-linking agent as co-monomers in a solvent containing acetic acid, to form a mixture;
    (b) adding an initiator of radical polymerization to said first mixture to form a pre-polymer;
    (c) dispersing said pre-polymer in a solution of alcohol, in a first dispersing stage, to form a first dispersion mixture; and
    (d) mixing said first dispersion mixture with an aqueous solution of an inorganic salt, in a second dispersing stage, to form a second dispersion mixture, so as to complete polymerization of the particulate matter of carboxylic cationites.

2. The method of claim 1, wherein an amount of said monovinyl monomer and an amount of said cross-linking agent are together in a range of from about 20 percent to about 30 percent weight per weight of said first mixture.

3. The method of claim 1, wherein said solvent includes an aqueous solution of acetic acid.

4. The method of claim 3, wherein said aqueous solution of acetic acid includes an amount of acetic acid in a range of from about 5 percent to about 15 percent volume per volume.

5. The method of claim 3, wherein said aqueous solution of acetic acid includes an amount of acetic acid in a range of from about 60 percent to about 100 percent volume per volume.

6. The method of claim 1, wherein said solvent includes an organic solvent.

7. The method of claim 6, wherein said organic solvent is selected from the group consisting of dimethylformamide, monobutyl glycolate and polyethylene glycol.

8. The method of claim 1, wherein said alcohol is selected from the group consisting of butyl alcohol, octyl alcohol and decyl alcohol.

9. The method of claim 8, wherein a ratio of said pre-polymer to said alcohol is in a range of from about 2.5:1 to about 5:1.

10. The method of claim 8, wherein a ratio of said pre-polymer to said alcohol is about 1:1.

11. The method of claim 1, wherein a ratio of said first dispersion mixture to said aqueous solution of said inorganic salt is in a range of from about 1:4 to about 1:5.

12. The method of claim 11, wherein said aqueous solution of said inorganic salt is an aqueous solution of sodium sulfate.

13. The method of claim 12, wherein an amount of said sodium sulfate in said aqueous solution of sodium sulfate is about 20 percent weight per weight.

14. The method of claim 1, wherein said monovinyl monomer is selected from the group consisting of a methacrylic acid, an acrylic acid and a methacryloylaminocarbonic acid.

15. The method of claim 1, wherein said monovinyl monomer is selected from the group consisting of methacryloylcaproic acid, methacryloylaminobenzoic acid, and methacryloylglycine.

16. The method of claim 1, wherein said cross-linking agent is a long chain cross-linking agent.

17. The method of claim 1, wherein said long chain cross-linking agent is selected from the group consisting of hexahydro-1,3,5-triacryloyltriazine (HTA), N,N'-methylenediacrylamide (MDAA), N,N'-ethylenedimethacrylamide (EDMA), N,N'-hexamethylenedimethacrylamide (HMDMA), triallylisocyanurate (TAIC), p-phenylenedimethacrylamide p-PHDMA), and benzidinedimethacrylamide (BDMA).

18. The method of claim 16, wherein said long chain cross-linking agent is selected from the group consisting of HTA, EDMA, and TAIC.

19. The method of claim 1, wherein said initiator is selected from the group consisting of ammonium persulfate, a 1,1' azobis (cyclohexanecarbonitrile), and a combination of ammonium persulfate-sodium methabisulfite.

20. The method of claim 1, wherein said alcohol includes butyl alcohol.

21. The method of claim 1, wherein said alcohol includes octyl alcohol.

22. The method of claim 1, wherein said alcohol includes decyl alcohol.

23. The method of claim 1, wherein said alcohol includes layrilic alcohol.

* * * * *